United States Patent [19]

Barthold

[11] Patent Number: 5,171,151

[45] Date of Patent: Dec. 15, 1992

[54] FOAM SCULPTING TOY

[75] Inventor: Mark J. Barthold, Redondo Beach, Calif.

[73] Assignee: Mattel, Inc., El Segundo, Calif.

[21] Appl. No.: 825,470

[22] Filed: Jan. 24, 1992

[51] Int. Cl.⁵ .............................................. G09B 11/00
[52] U.S. Cl. ..................................... 434/82; 446/385; 446/491; 446/85
[58] Field of Search ............... 446/491, 385, 268, 153, 446/15, 99, 100, 85, 97; 434/81, 82

[56] References Cited

U.S. PATENT DOCUMENTS 2,011,714  8/1935  Friedman ........................... 434/81 X
3,783,554  1/1974  Shapero ............................ 446/385 X Primary Examiner—Mickey Yu
Attorney, Agent, or Firm—Roy A. Ekstrand

[57] ABSTRACT

A generally circular floating base includes a support surface for receiving a quantity of soap foam to form a sculpted foam body. A plurality of lightweight play elements having different shapes and configurations are partially embedded by the child user within the foam body to enhance the appearance of the sculpted foam and provide a variety of appearance functions.

6 Claims, 2 Drawing Sheets

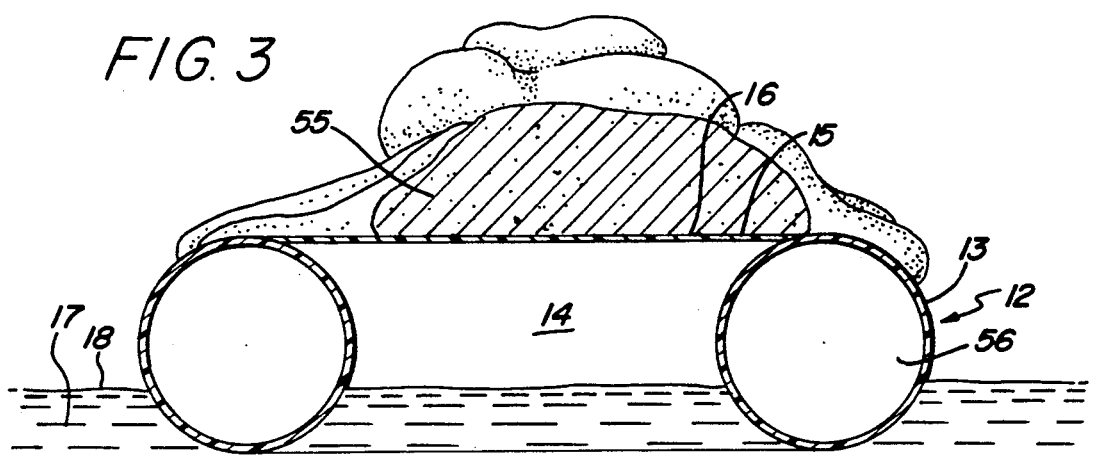
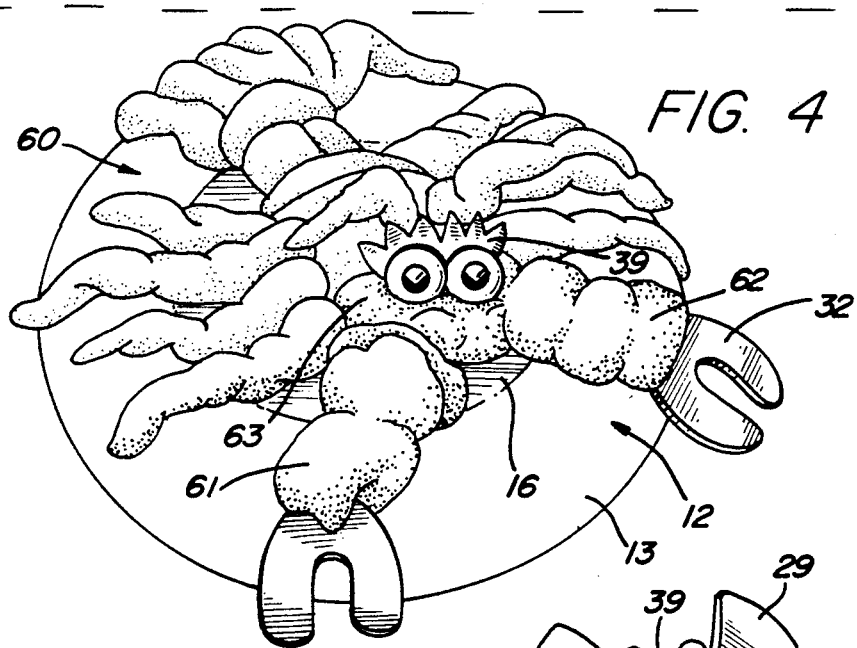
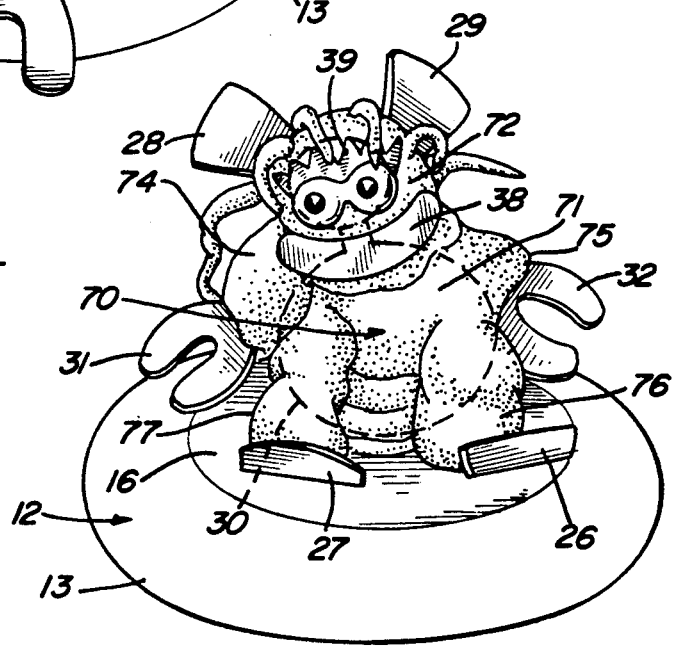

FOAM SCULPTING TOY

FIELD OF THE INVENTION

This invention relates generally to toys having multiple configurations and appearances.

BACKGROUND OF THE INVENTION

Toys capable of being configured in a plurality of appearances have enjoyed great popularity through the years. To make use of this popularity, practitioners in the toy arts have provided a great variety of multiple appearance or multiple configuration toys for the consumer. For example, U.S. Pat. No. 4,979,924 issued to Manger sets forth a TOY KIT WITH STUFFED ANIMAL-LIKE FIGURE HAVING CHANGEABLE APPEARANCE in which a padded animal is formed having an outer skin comprising the loop fabric of the type generally used in hook and loop fabric fasteners. A plurality of accessories having various appearance configurations include areas having the corresponding hook fabric of the type producing a hook and loop attachment to the stuffed animal. The appearance figures include a broad range of elements such as ears, eyes, nose, tail and so on.

U.S. Pat. No. 3,097,446 issued to Packer sets forth a TOY FIGURE formed of a resilient molded plastic material or the like. The molded plastic material may be formed or modeled into a plurality of resilient shapes and figures to change the appearance of the toy figure.

U.S. Pat. No. 4,504,240 issued to Thomas sets forth a HAND PUPPET WITH DETACHABLE FACIAL ELEMENTS having a relatively rigid head portion and a plurality of facial components which may be attached to the head portion. The head portion supports an attachment fabric such as either a conventional hook or conventional loop fabric of the type used to form hook and loop fabric attachments. The attachable facial elements include areas having the corresponding or cooperating attachment fabrics whereby the facial elements may be removably secured to the head of the puppet.

U.S. Pat. No. 4,908,001 issued to Kopian sets forth a SOFT LATEX FIGURE AND METHOD OF MAKING THE SAME in which a soft latex figure is formed by sculpting clay appendages, making a plaster casting of the appendages, slush molding a colored pre-vulcanized latex replica of the appendage in a plaster mold, wrapping a form or base structure representing the torso with batting, and securing the molded latex appendages in position on the form. The figure is completed using strips of paper toweling saturated with colored pre-vulcanized latex applied to the form.

U.S. Pat. No. 4,738,647 issued to Renger, et al. sets forth an ACTIVITY TOY FOR FORMING AND DISSOLVING A TOY FIGURE in which a plastic skeleton is configured to receive and support a quantity of sodium bicarbonate powder in a sculpting activity enclosing the skeleton. A vat of dilute citric acid is included with the activity toy. In the anticipated play pattern, the sodium bicarbonate material sculpted toy figure is immersed into the diluted citric acid producing a chemical reaction which removes the sculpted bicarbonate material in a dramatic effect and reveals portions of the underlying skeleton.

While the foregoing described changeable appearance toys have enjoyed some success in the marketplace and provided some measure of amusement and entertainment value, there remains a continuing need in the art for evermore improved and interesting toy products having changeable or multiple appearances.

SUMMARY OF THE INVENTION

Accordingly, it is a general object of the present invention to provide an improved multiple appearance toy. It is a more particular object of the present invention to provide an improved multiple appearance toy which may be easily sculpted or configured to assume a desired appearance.

In accordance with the present invention, there is provided a foam sculpting toy comprises: foam means for producing a quantity of soap foam; a base having a support surface for receiving and supporting the quantity of soap foam; and a plurality of lightweight play elements having sufficiently low densities with respect to the consistency of the soap foam to be supportable by the soap foam, the foam means operable to produce the quantity of soap foam in a selected shape upon the support surface of the base and the plurality of play elements being partially embedded within the selected shape and being retained in the foam body by the resilience of the soap foam.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 sets forth a section view of the present invention foam sculpting toy taken along section lines 3—3 in FIG. 2;

FIG. 4 sets forth an exemplary completed foam sculpted toy constructed in accordance with the present invention; and FIG. 5 sets forth an alternate configuration of a foam sculpted toy constructed in accordance with the present invention.

DESCRIPTION OF THE PREFERRED EMBODIMENT

Figure 1:
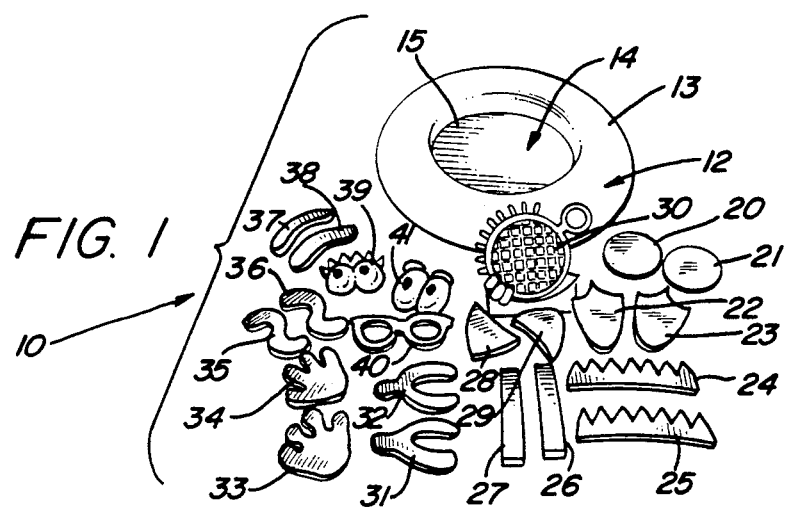
FIG. 1 sets forth a perspective view of an exemplary component set for the present invention foam sculpting toy.

FIG. 1 sets forth a perspective view of a foam sculpting toy constructed in accordance with the present invention and generally referenced by numeral 10. Foam sculpting toy 10 includes a floating base 12 having an inflated toroid 13 and defining a center recess 14. Floating base 12 further includes a support member 15 extending across recess 14 and coupled to inflated toroid 13. Foam sculpting toy 10 further includes a plurality of play elements 20 through 41 preferably formed of a generally lightweight material such as die-cut plastic, foam or the like. While the shapes and configurations of play elements 20 through 41 may assume a virtually endless variety, the plurality set forth in FIG. 1 provides a representative example of the different play element shapes which may be used in the manner set forth below. For example, the disk-like shape of play elements 20 and 21 provides various elements such as a set of spectacles or, perhaps, an ornamentation such as earrings or the like. Similarly, play elements 22 and 23 may, for example, provide a set of feet for a foam sculpted creature while elements 24 and 25 may alternatively provide appearance elements such as eyebrows or fin members associated with aquatic or marine animals. Similarly, triangular elements 28 and 29 may, for example, be used to form a pair of ears upon the foam sculpted creature and so on. Thus, it will be apparent to those skilled in the art that the representative plurality of play elements shown in FIG. 1 are capable of a multiplicity of appearance uses and thus, add greatly to the flexibility and enjoyment of the present invention foam sculpting toy. Of particular interest is play element 30 which, in its preferred form, comprises a molded plastic material having a generally rigid shape and thus being suitable to provide interior body support for foam sculpted elements in the manner set forth below.

Figure 2:
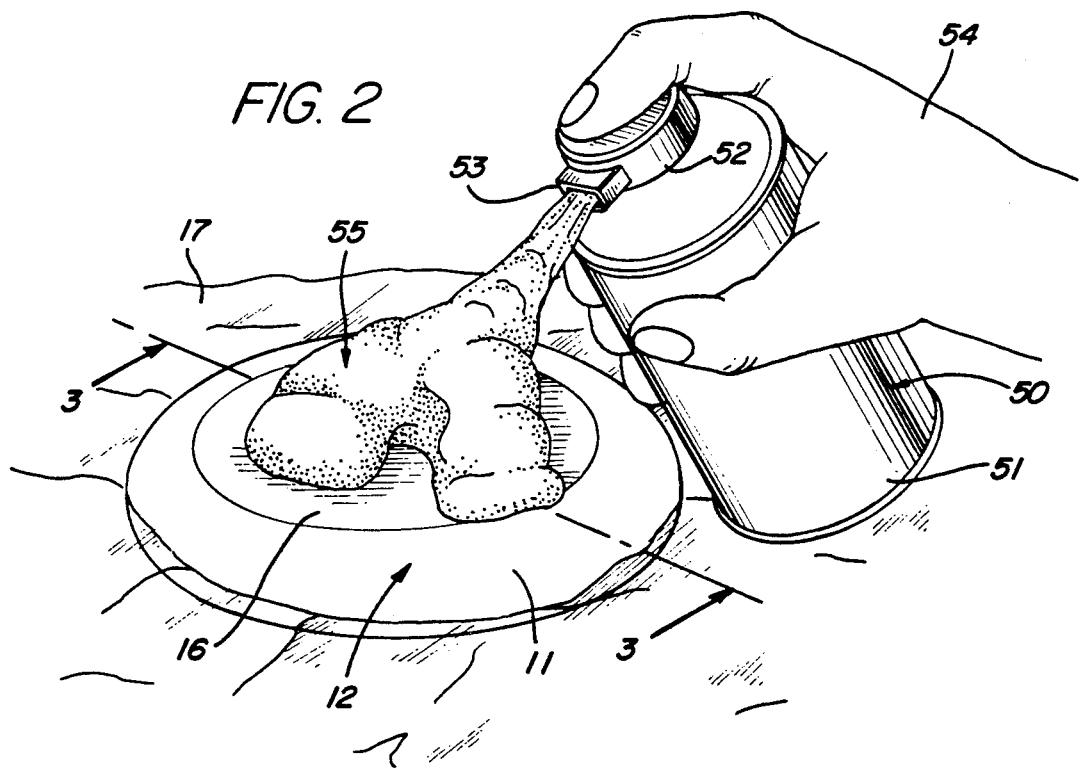
FIG. 2 sets forth a perspective view of the initial stage of utilizing the present invention foam sculpting toy in its anticipated play pattern.

FIG. 2 sets forth the initial stage of foam sculpting play activity for the present invention foam sculpting toy. Thus, in accordance with the anticipated play pattern, floating base 12 includes an inflated toroid 13 having a support surface 16 extending across the upper surface of toroid 13. A water surface 17 which may, for example, comprise a child's bath water, receives and supports floating base 12 in the manner shown in FIG. 2. It should be noted with temporary reference to FIG. 1 that floating base 12 is shown inverted in FIG. 1 such that recess 14 is accessible. In this position, recess 14 may be utilized to receive play elements 20 through 41 to provide a convenient carrying support therefor. It should also be noted with reference to FIGS. 1 and 2 concurrently that surface 16 comprises the outer or upper surface of support member 15. Thus, in its preferred form, support member 15 includes a resilient plastic generally planar member extending across the upper surface of toroid 13.

In further accordance with the present invention, an aerosol foam soap dispenser 50 is constructed in accordance with conventional aerosol canister techniques and includes a pressurizable canister 51 having a push cap 52 and a nozzle 53. In its preferred form, aerosol foam soap dispenser 50 is fabricated in the manner presently used to fabricate the well known pervasive shaving cream dispensers in which a quantity of foaming material and shaving soap is included within the pressurized canister interior. Thus, dispenser 50 may be provided using a conventional shaving cream dispenser or the like with the essential feature being the provision of a controllable stream of soap foam from nozzle 53 when push cap 52 is pressed. Thus, in accordance with the anticipated play pattern of the present invention, the user having a hand 54 grasps dispenser 50 about canister 51 and depresses push cap 52 while directing nozzle 53 at surface 16 of floating base 12. With careful control of the foam soap dispensing, the user is able to deposit a quantity of soap foam having a consistency generally corresponding to shaving cream or whipped toppings which exhibit the capability to "peak". Thus, while the density of soap foam 55 may be varied somewhat with designer's choice, it is preferable that the soap foam be sufficiently thickened so as to generally support its own weight and then some. The process set forth in FIG. 2 is continued as the user continues to direct nozzle 53 at floating base 12 to provide the desired shape and size of soap foam deposit 55.

FIG. 3 sets forth a section view of soap foam deposit 55 and floating base 12 taken along section lines 3—3 in FIG. 2. As described above, floating base 12 includes an inflated toroid 13 defining a recess 14 and a support member 15. Support member 15 defines an upper surface 16 which receives the above-described quantity of soap foam 55. In its preferred form, toroid 13 is fabricated of a resilient plastic or rubber and includes a somewhat pressurized interior chamber 56. As a result, floating base 12 easily floats upon the surface 18 of water 17. As mentioned above, in its anticipated use, water 17 may comprise the bathwater or the like of a child user. Alternatively, however, virtually any surface may be used to support base 12 and carry forward the present invention foam sculpting.

FIGS. 4 and 5 set forth exemplary alternative configurations for the present invention foam sculpting toy. It should be apparent to those skilled in the art that the examples set forth in FIGS. 4 and 5 are merely representative of the virtually endless variety of shapes and configurations which may be attained using the present invention foam sculpting toy.

Specifically, with reference to FIG. 4, base 12 includes inflated toroid 13 and support surface 16 as described above. A quantity of soap foam is deposited in the above-described manner upon base 12 to form a foam sculpted body 60. Body 60 generally corresponds to a fanciful sea creature having formed therein a head 63 and a pair of front legs 61 and 62 extending outwardly therefrom. To complete the fanciful appearance of the foam sculpting, a plurality of play elements selected from the plurality set forth above in FIG. 1 is partially embedded within foam sculpted body 60. More specifically, play elements 31 and 32 are partially embedded within the end portion of front legs 61 and 62 respectively of sculpted foam body 60. The fork-like extensions of play elements 31 and 32 provide the appearance corresponding to the front claws or the like of a fanciful sea creature. Similarly, play element 39 which generally resembles a pair of eyes and overlying eyebrows or the like is partially embedded within head portion 63 of foam sculpted body 60 to complete the foam sculpted figure. It will be apparent to those skilled in the art that a virtually endless variety of combinations of foam sculpted body shape and arrangement of play elements such as elements 20 through 41 in FIG. 1 may be used in accordance with the present invention. The use of foam soap for the sculpted body provides the additional benefit of easy cleanup particularly in the bathtub environment. Because the soap used in sculpted body 60 is preferably formed of a water soluble washing soap, cleanup is accomplished by simply immersing base 12 within the bath water and retrieving play elements 31, 32 and 39. Thereafter, base 12 may be positioned upon the water surface and a new and different figure may be formed in the manner described above in FIG. 2.

FIG. 5 sets forth an alternate sculpted foam toy constructed in accordance with the present invention. As is set forth above, base 12 is positioned upon the supporting surface such that surface 16 faces upwardly. A foam sculpted body 70 is formed upon surface 12 to generally replicate a torso 71, a head 72, a pair of arms 74 and 75 and legs 76 and 77. In accordance with the present invention, the strength of foam body 70 is enhanced by forming body 70 about play element 30 (seen in FIG. 1) which provides a convenient support member to permit foam body 70 to extend vertically and remain upright.

To complete the appearance of the foam sculpted toy of FIG. 5, play elements 26 and 27 are partially embedded within leg portions 76 and 77 respectively to provide the appearance of feet or similar appendages. Also, play elements 31 and 32 are partially embedded within arm portions 74 and 75 respectively of foam body 70 to provide a claw or hand-like appearance for the fanciful character thus created. To provide further variety, play element 38 is partially embedded within head portion 72 of foam sculpted body 70 to provide the appearance of a smile or mouth while play element 39 which forms a pair of juxtaposed eyes is similarly embedded within head portion 72 to complete the "facial" appearance of foam sculpted body 70. Play elements 28 and 29 are partially embedded within the upper portion of head portion 72 of foam body 70 to provide appendages similar to ears or the like. Once again, it will be apparent to those skilled in the art that while the fanciful character depicted in FIG. 5 using a shaped foam sculpted body and a selected group of play elements 20 through 41 provides a convenient illustrative example of the present invention foam sculpting toy, a virtually endless variety of foam sculpted body shapes and combinations of play elements may be utilized without departing from the spirit and scope of the present invention. As set forth above, the cleanup is particularly easy in connection with the above-described foam sculpting toy in that the soap foam is preferably a water soluble soap which may readily be dissolved within the child user's bath water and thus facilitate the complete cleanup and permit the fabrication of still further alternate shapes of foam sculpted toys.

What has been shown is a novel foam sculpting toy in which a float member receives an appropriately shaped foam body produced by a generally conventional pressurized canister to provide the basis for the foam sculpture. Thereafter, the foam body may be shaped as desired by the child user. A selected plurality of lightweight play elements having a variety of appearance characteristics are then creatively embedded within the foam body to provide the desired appearance of the foam sculpture. The use of conventional water soluble soap foam which may, for example, comprise conventional shaving lather or the like, facilitates the easy cleanup and reuse of the base member and play elements. The foam sculpting toy shown has particular advantage when used as a bath toy by the child user within a water filled bathtub in that it encourages the bathing practice of the child and the repeated dissolving of the soap foam into the bathwater provides enhanced cleansing during bathing.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A foam sculpting toy comprising:
   foam means for producing a quantity of soap foam;
   a base having a support surface for receiving and supporting said quantity of soap foam; and
   a plurality of lightweight play elements having sufficiently low densities with respect to the consistency of said soap foam to be supportable by said soap foam,
   said foam means operable to produce said quantity of soap foam in a selected shape upon said support surface of said base and said plurality of play elements being partially embedded within said selected shape, and being retained in said foam body by the resilience of said soap foam.

2. A foam sculpting toy as set forth in claim 1 wherein said play elements include elements formed of a generally rigid foam plastic material.

3. A foam sculpting toy as set forth in claim 2 wherein said base has sufficient buoyancy to float upon water.

4. A foam sculpting toy as set forth in claim 3 wherein said base is generally circular.

5. A foam sculpting toy as set forth in claim 4 wherein said base includes a toroidal float.

6. A foam sculpting toy as set forth in claim 1 wherein said play elements include a generally circular support element having a plurality of apertures therethrough.

* * * * *